United States Patent
Guigné et al.

(10) Patent No.: US 8,391,103 B2
(45) Date of Patent: Mar. 5, 2013

(54) METHOD FOR ACCENTUATING SPECULAR AND NON-SPECULAR SEISMIC EVENTS FROM WITHIN SHALLOW SUBSURFACE ROCK FORMATIONS

(75) Inventors: Jacques Y. Guigné, Paradise (CA); J. Kim Welford, St. John's (CA); Adam Gogacz, Pouch Cove (CA); Clyde Clements, St. John's (CA)

(73) Assignee: PanGeo Subsea, Inc., St. John's, NL (CA)

( * ) Notice: Subject to any disclaimer, the term of this patent is extended or adjusted under 35 U.S.C. 154(b) by 373 days.

(21) Appl. No.: 12/834,096

(22) Filed: Jul. 12, 2010

(65) Prior Publication Data
US 2012/0008461 A1 Jan. 12, 2012

(51) Int. Cl.
*G01V 1/36* (2006.01)
*G01V 1/20* (2006.01)

(52) U.S. Cl. .............. 367/56; 367/36; 367/37; 367/38

(58) Field of Classification Search .............. 367/36–38, 367/56–59
See application file for complete search history.

(56) References Cited

U.S. PATENT DOCUMENTS

| | | | |
|---|---|---|---|
| 3,793,620 A * | 2/1974 | Miller | 367/56 |
| 4,319,347 A | 3/1982 | Savit | |
| 4,476,552 A * | 10/1984 | Waters et al. | 367/56 |
| 5,787,051 A * | 7/1998 | Goodway et al. | 367/56 |
| 6,009,042 A | 12/1999 | Workman et al. | |
| 6,028,822 A * | 2/2000 | Lansley et al. | 367/62 |
| 2005/0219949 A1 | 10/2005 | Taner et al. | |
| 2009/0122645 A1 | 5/2009 | Guigne et al. | |

FOREIGN PATENT DOCUMENTS
WO 2009062286 A3 5/2009

OTHER PUBLICATIONS
International Search Report and Written Opinion, International Application PCT/CA2011/000767.

* cited by examiner

Primary Examiner — Ian Lobo
(74) Attorney, Agent, or Firm — Richard A. Fagin

(57) ABSTRACT

A method for evaluating subsurface formations includes deploying at least two intersecting seismic transducer lines above an area of the subsurface to be surveyed. Each line includes spaced apart seismic transmitters on one side of the intersection and spaced apart seismic receivers on the other side. On each line, one of the transmitters is actuated and signals are detected at one of the receivers. The foregoing is repeated for each of the remaining receivers. The foregoing is then repeated for each of the remaining transmitters on each line. The detected signals are processed to enhance both specular and non-specular seismic events in the subsurface. The enhanced events may be stored and/or displayed.

6 Claims, 3 Drawing Sheets

METHOD FOR ACCENTUATING SPECULAR AND NON-SPECULAR SEISMIC EVENTS FROM WITHIN SHALLOW SUBSURFACE ROCK FORMATIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of seismic exploration of subsurface rock formations. More specifically, the invention relates to high resolution, shallow depth seismic investigation to identify potential subsurface hazards.

2. Background Art

Explorationists are continually adopting new and improved techniques for seismic imaging of subsurface rock formations. In addition to applying traditional seismic processing techniques to novel acquisition geometries, the techniques of arraying and beam forming can be used to enhance seismic resolution for a variety of deep earth and shallow geotechnical investigations or applications. U.S. Patent Application publication No. 2009/0122645 filed by Guigné and Pace, for example, describes a star array for beamforming and steering at depth to identify non-specular features. Such a method leads to the potential for higher resolution structural imaging of deep earth reservoirs and surrounding geology (e.g. faults, stratigraphic inhomogeneities) and for the identification of near surface geohazards (e.g. shallow gas, hydrates, sediment liquefaction). The most important applications from a perspective of reservoir management are the capture of high resolution localization of seismic attributes, which could be used for characterizing complex stratigraphies to a specific volume that is much smaller than is possible with conventional three dimensional (3D) seismic methods.

In the case of near surface geotechnical site investigations in marine environments, the risk of unforeseen sub-seabed conditions is of particular concern to offshore installations as failure to identify sub-seabed hazards can lead to environmental disasters, significant cost overruns and adverse safety impacts. To mitigate such risks, geophysical and geotechnical site investigation procedures are executed before operations on a site begin. The investigations follow industry accepted standards that rely on interpretations of geological features based on interpolations between direct seismic soundings. Consequently, such investigations do not deliver results with resolution that engineering exactness may require. Nevertheless, industry accepted procedures for site evaluation are widely recognized as "best practices." As offshore engineering and exploratory drilling projects become more numerous, and are conducted in ever greater water depths, there will be demand for acquiring more reliable, more detailed information concerning subsurface structure and stratigraphy. It is recognized that shortcomings exist in the site evaluation techniques that are currently being used. Therefore a reevaluation of what constitutes appropriate localized high resolution imaging of discrete targets is underway, be it for deep earth seismic mapping of scattering features or for near surface foundation related studies.

Geophysical and geotechnical site investigation methods recognized as industry standards use continuous seismic surveys, and borehole or well downhole imaging if available. Advantages of continuous seismic profiling include its ability to map the continuity of coherent sedimentary layers. In conventional seismic surveying, the resolution is determined by a combination of the dominant frequency propagated to and from reflectors (e.g., a reservoir) and by the algorithm(s) used to convert the time based data volume to a true depth volume. The vertical resolution is mostly controlled by the source frequency while the lateral resolution is much more controlled by the inversion (migration) algorithm. A particular problem emerges when the sedimentary or sub bedrock character becomes discontinuous because of discrete scattering bodies instead of continuous well defined coherent layered boundaries.

There continues to be a need for improved techniques for sub-bottom evaluation of marine operating sites to identify structural and stratigraphic features in detail.

SUMMARY OF THE INVENTION

A method for evaluating subsurface formations according to one aspect of the invention includes deploying at least two intersecting seismic transducer lines above an area of the subsurface to be surveyed. Each line includes spaced apart seismic transmitters on one side of the intersection and spaced apart seismic receivers on the other side. On each line, one of the transmitters is actuated and signals are detected at one of the receivers. The foregoing is repeated for each of the remaining receivers. The foregoing is then repeated for each of the remaining transmitters on each line. The detected signals are processed to enhance both specular and non-specular seismic events in the subsurface. The enhanced events may be stored and/or displayed.

Other aspects and advantages of the invention will be apparent from the following description and the appended claims.

DETAILED DESCRIPTION

Figure 1:
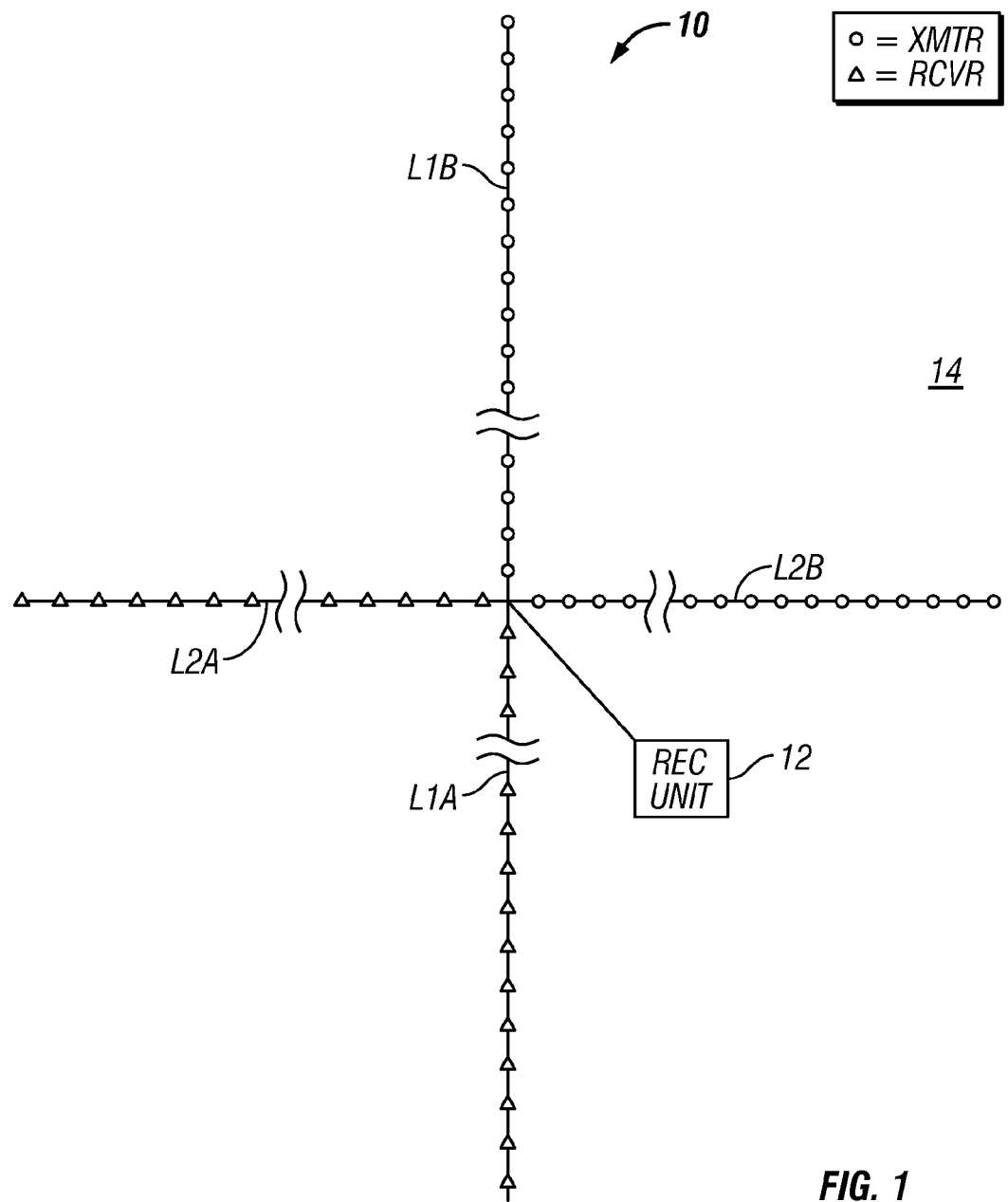
FIG. 1 shows an example seismic acquisition array that may be used in accordance with the invention.

An example of a shallow sub-seabed seismic investigation array is shown schematically in FIG. 1. The array 10 may include two (or more) stationary, crossed seismic transducer lines, L1A, L1B being one line, and L2A, L2B being the other line. The lines are disposed on the water bottom 14. The lines are contemplated as being about 12 meters in length (combined A and B sections), but the exact length is not a limit on the scope of the present invention. The lines include acoustic transmitters on one side of the intersection of the lines (on line segments L1B, L2B and) acoustic receivers on the other side of the intersection (on line segments L1A, L2A) to acquire multi-fold offset seismic data. The receivers may be single component sensors, such as pressure or pressure time gradient sensors, may be single or multiple component particle motion sensors, or substantially collocated pairs of such pressure responsive and motion responsive sensors.

A typical spacing between adjacent receivers and transmitters may be about ¼ wavelength of the acoustic energy emitted by the transmitters to avoid spatial aliasing. In the present example, the transmitters may be piezoelectric transducers, parametric arrays or similar devices. For shallow geohazard evaluation, the transmitters may have a frequency range and be actuated by a chirp in a range of about 2 KHz to 10 KHz. An example spacing between adjacent receivers and transmitters may be about 0.1 meters for such transmitter and chirp frequency. For deeper reservoir evaluation, an example frequency range for the transmitters and chirp may be 50 to 200 Hz, with a spacing between adjacent transmitters and receivers of about 2 to 4 meters. Length of the lines will be correspondingly longer in such lower frequency examples.

Actuation of the transmitters may be controlled by certain equipment (not shown separately) in a recording unit 12. The signals generated by the receivers in response to detected acoustic energy may be electrical and/or optical and may be related to the acoustic amplitude. Detection of the signals produced by the individual receivers may be recorded by suitable devices in the recording unit 12, and such recordings are typically indexed with respect to actuation time of a particular one of the transmitters. The recording unit 12 may be disposed on a vessel (not shown) on the water surface, or may be deployed on the water bottom or in a buoy and programmed to operate an acquisition sequence automatically. Corresponding structures may be devised for use on the land surface.

The array 10 deployed as shown in FIG. 1 represents one acquisition site. After all data are acquired (explained further below) for a particular acquisition site, the array 10 may be moved to a different site, for example, a contiguous site, or any other site, or additional arrays arranged substantially as shown in FIG. 1 may be deployed at different sites contemporaneously and operated as will be explained below.

The individual transmitters and receivers in the array 10 may be operated as follows. For each acquisition element in an acquisition sequence one transmitter may be actuated (e.g., along line segment L1B starting nearest the center of the array 10), and a time indexed record of signals detected by the closest offset receiver on the opposed line segment (e.g., L1A) may be made in the recording unit 12. A next acquisition element in the sequence may include actuation of the same transmitter and recording the signals detected by the adjacent, larger offset receiver along the same line. Thus, receiver offsets would be varied with an offset increment of the selected adjacent receiver spacing, in the present example about 0.1 m. The following description illustrates the foregoing acquisition geometry. Consider a single transmitter and a single receiver, place the two as close to each other as possible in the x-y coordinate grid, wherein the receiver is at $(-r_0, 0)$ and the transmitter is located at $(s_0, 0)$, where $r_0$ and $s_0$ are positive numbers. Activate the transmitter and record the incoming signal. Next while using the same transmitter, select the adjacent receiver along the line, an additional receiver spacing away from the transmitter (e.g., the receiver at $(-(r_0+0.1), 0)$) and activate the transmitter and record the incoming signal. The foregoing may be continued until the signal from the most distant receiver along the line (L1A) has been recorded. The offset span thus traverses approximately 6 meters.

Next, the adjacent transmitter along the line (L1B) is actuated. At the example spacing between transmitters of 0.1 m the foregoing has the coordinates $(s_0+0.1, 0)$. The signals from the first receiver [at $(-r_0, 0)$] are recorded. The foregoing actuation, signal detection and recording may be repeated for each successively adjacent receiver for the second transmitter.

The foregoing procedure may then be repeated for each successively adjacent transmitter along the line (L1B).

The entire acquisition procedure described above with reference to line L1A, L1B may then be repeated for line L2A, L2B. The second line is acquired in precisely the same manner with the exception that the transmitter and receiver line is rotated by 90° with respect to the first line. Although the acquisition sequence described above contemplates operating the transmitters and receivers in adjacent order, any combination of transmitter actuations and receiver recordings that provides recordings for substantially all combinations of individual transmitters and receivers may be used in accordance with the invention. It is only necessary to identify which transmitter and which receiver are operated for any individual signal recording.

In some examples, for acquisition of signals by each individual receiver, the same particular transmitter may be actuated a plurality of times, the signals detected by the respective receiver recorded, and such recordings may be summed or stacked. Such stacking of multiple recordings of receiver signals from the same receiver and the same transmitter is expected to enhance both signal to noise ratio and to increase the frequency content of the stacked seismic signals as contrasted with recorded signals from only a single actuation of the respective transmitter.

The foregoing acquisition technique can result in the acquisition of data that can be processed in the same manner as conventional seismic data to identify specular reflection seismic events as well as for enhancing identification of non-specular seismic events such as diffractors and discontinuities. The general processing flow for specular reflection event identification may include the following with reference to the flow chart in FIG. 2, wherein a single receiver recording in response to a single actuation of a transmitter is referred to as a "trace"

Figure 2:
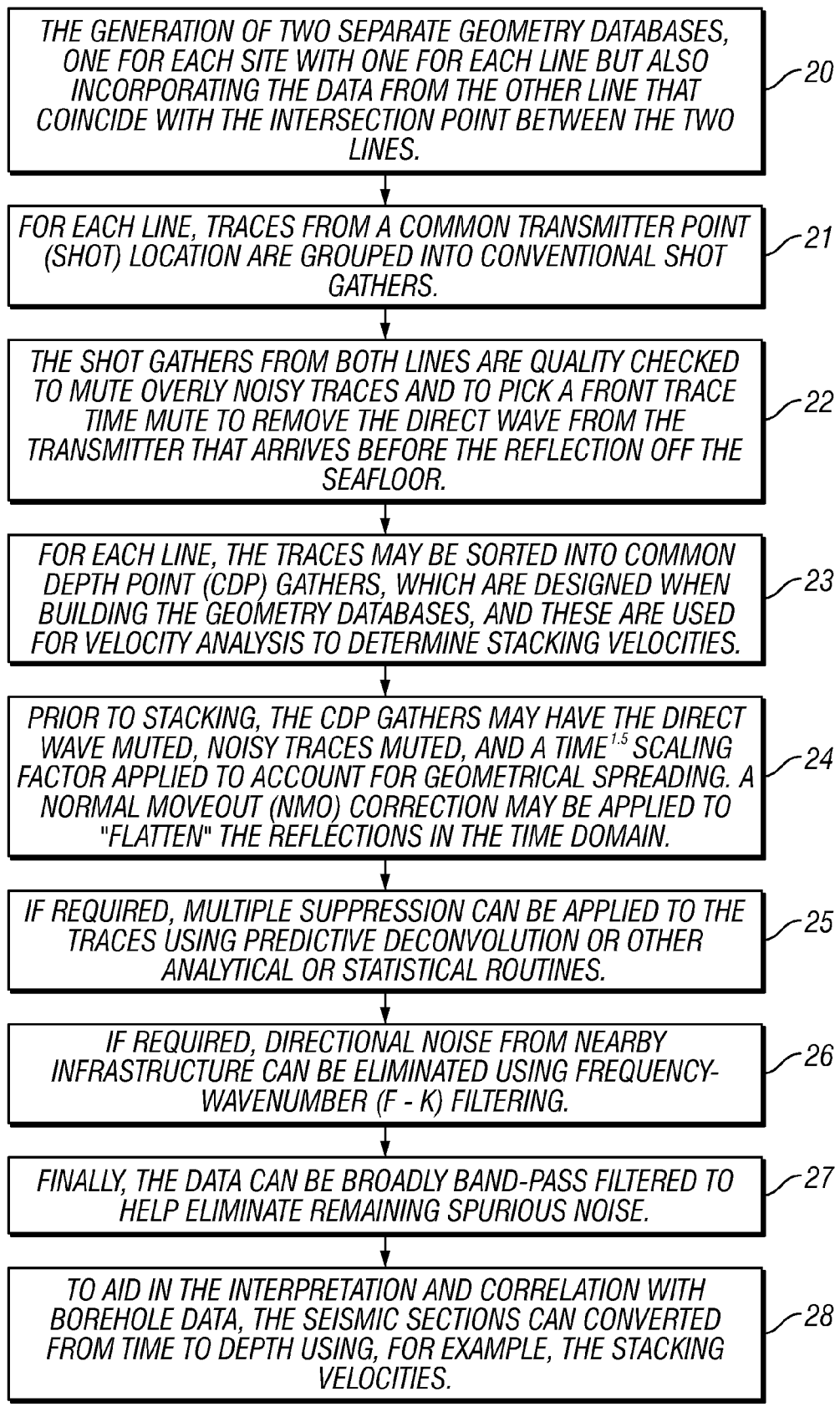
FIG. 2 is a flow chart of an example specular event data processing procedure.

As shown at 21 in FIG. 2, two separate geometry databases may be generated, one for each site, with one database for each line. However, the database for each line may also incorporate the data from the other line that coincide with the intersection point between the two lines. At 22, for each line, traces from a common transmitter point (common shot point) location may be grouped into conventional common shot gathers. At 23, the common shot gathers from both lines may be quality checked to mute excessively noisy traces and to select a front trace mute time to mute the direct wave arriving at each receiver directly from the transmitter. Such direct wave typically arrives at each receiver before the reflected energy from acoustic impedance boundaries in the subsurface. At 24, for each line, the traces may then be sorted into common depth point (CDP) gathers, which are designed when building the geometry databases. The CDP gathers may be used for velocity analysis to determine stacking velocities. At 25, prior to stacking, the CDP gathers may have the direct wave muted as explained above, have noisy traces muted, and have applied thereto a scaling factor to account for geometrical spreading. A typical scaling factor is $t^{1.5}$ where t represents time from actuation of the transmitter. A normal moveout (NMO) correction may be applied to "flatten" the reflections in the time domain. If required, at 26, multiple reflection suppression can be applied to the traces using predictive deconvolution or other analytical or statistical routines known in the art. At 27, if required, directional noise from nearby infrastructure can be eliminated using velocity filtering, for example, frequency-wavenumber (f-k) filtering. At

28, the data can be broadly band-pass filtered to attenuate remaining spurious noise. To aid in the interpretation and correlation with borehole data if available, at 29, seismic sections made from the processed traces (e.g., record sections representing stacked recordings corresponding to each selected receiver position) can be converted from time to depth using, for example, the stacking velocities or RMS velocities. In the case the seabed topography or any of the underlying reflecting horizon(s) is (are) sufficiently variable in geometry, with respect to the dominant wavelength of the source wavelet, the imaging of the subsurface may require the use of a prestack depth migration routine; this results in correct placement, in space, of the returned energy while at the same time producing a velocity model of the subsurface. The seismic sections may be plotted or displayed conventionally.

In the foregoing particular example, the data acquisition technique results in much denser surveying than has been previously achieved in shallow sub-seabed profiling techniques. The resulting common-depth-point (CDP) spacing from the above described data recordings (with transmitter and receiver spacing of 0.1 meters) is 0.05 meters and stacking folds along the lines increase from 1 to 54 toward the centre of the lines and spike to 96 at the intersection point using the example 12 meter lines. Over 5,800 acoustic traces would be acquired in such manner using the two crossed lines shown in FIG. 1. The multiplicity of data allows for substantial resolution enhancement of the resulting cross-sections, principally through the stacking of coherent events and cancellation of noise. This translates into cross-sections containing fine stratigraphic detail in the basin sediments such as for sands and clays. The final outputs from such densely populated cross data acquisition are two unmigrated time sections beneath the site of investigation in which coherent reflections are enhanced and random noise is subdued through the stacking process. Where borehole data constraints are available, such as from acoustic well logs or wellbore seismic surveys, these can be correlated against the depth-converted seismic horizons obtained from the data acquired as explained above.

In addition to providing higher resolution cross-sections of the specular reflection events for a given survey, non-specular events can also be investigated in the volume beneath the two acquisition lines using the same data using beamforming and beam steering. The non-specular data carry extremely rich information detailing the distribution of local heterogeneities as well as the spatial distribution of specular discontinuities. In the case of an isotropic point source, the amplitudes of specular reflections are larger than those of non-specular events by at least an order of magnitude; thus, the non-specular seismic information is dominated by specular reflections. Consequently, the specular reflections must be removed or subdued in order for beamforming and beam steering to work effectively on the non-specular events.

To achieve this for the example data acquisition, the shot gathers can be remapped from the shot-receiver domain to the common-offset domain. Under the assumption that the specular reflectors are sub-horizontal, it is assumed that in the common-offset domain non-specular events are characterized by hyperbolas, and that the specular events are characterized by horizontal reflections. Consequently, velocity filtering such as frequency-wavenumber (f-k) filtering of horizontal reflections is sufficient to attenuate the amplitudes of the specular reflections. Attenuating the specular reflection events accentuates the non-specular events. On the scale of meters, the assumption of specular horizontally is reasonably correct. If, however, the dip or geometry variations of specular reflections is significant, the reflective boundaries must be mapped to a horizontal datum in the common-offset domain using a wave equation consistent method, followed by frequency-wavenumber (f-k) filtering as mentioned above, and subsequently remapped to their original datum. Once the non-specular data are accentuated, a beamforming and beam steering through the data may be performed, and the non-specular events are mapped into their correct spatial locations. Naturally, knowledge of the velocity field is necessary for the successful beam steering. The velocity field information may be obtained, for example, from the conventional processing of the data.

Figure 3:
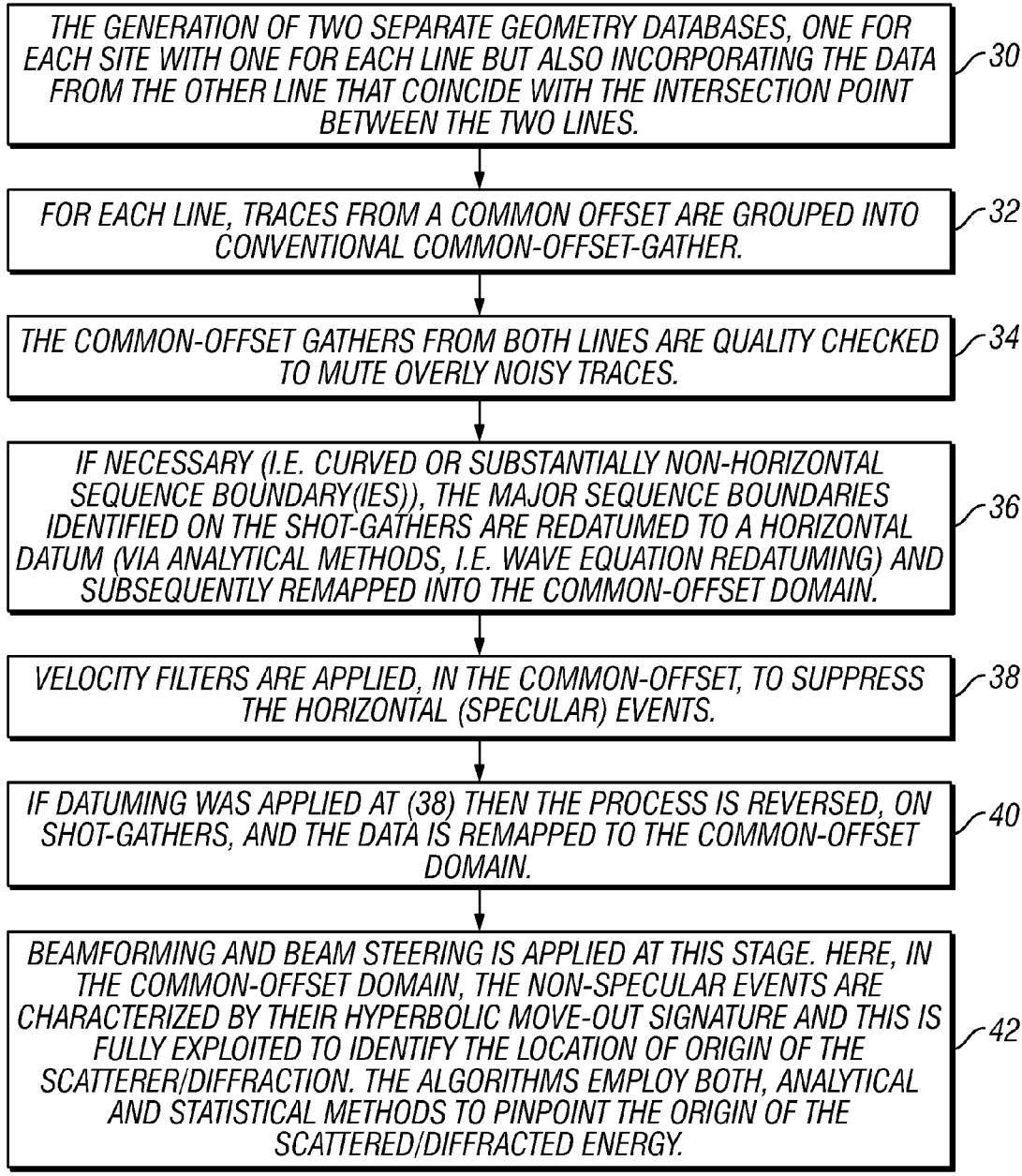
FIG. 3 is a flow chart of an example non-specular event data processing procedure.

An example of non-specular event processing workflow, with reference to the flow chart in FIG. 3 may be as follows. At 30, two separate geometry databases may be generated, one for each site with one for each line but also incorporating the data from the other line that coincide with the intersection point between the two lines. At 32, for each line, traces from a common offset are grouped into a conventional common-offset-gather. At 34, the common-offset gathers from both lines are quality checked to mute overly noisy traces. At 36, if necessary (i.e. curved or substantially non-horizontal sequence boundary(ies)), the major sequence boundaries identified on the common shot gathers can be redatumed to a horizontal datum (via analytical methods, i.e. wave equation redatuming) and subsequently remapped into the common-offset domain. At 38, velocity filters are applied in the common-offset gather to suppress the horizontal (specular) events. If datuming was applied at 38 then the process is reversed, on shot-gathers, and the data is remapped to the common-offset domain. At 40, beamforming and beam steering is applied. In the common-offset domain, the non-specular events are characterized by hyperbolic move-out signature and this is fully exploited to identify the location of origin of the non-specular event. The algorithms may use either or both analytical and statistical methods to locate and plot the origin of the non-specular energy.

The improved higher resolution imaging of specular reflections than has ever been acquired in shallow environments, the specific imaging and capturing of the more complex scatterers that may be present such as to be seen in boulder clay or glacial related deposits or subtle complex stratigraphies, faults, and fractures, and finally the method to separate the specular and non-specular fields constitute this invention's novel signal processing approach.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for evaluating subsurface formations for specular and non-specular seismic events, comprising:
    deploying at least two intersecting seismic transducer lines above an area of the subsurface to be surveyed, each line including only spaced apart seismic transmitters on one side of the intersection and only spaced apart seismic receivers on the other side thereof;
    on each line, actuating one of the transmitters, detecting signals at one of the receivers, and repeating the actuating the transmitter and detecting signals for each of the remaining receivers;
    on each line, repeating the actuating and detecting signals at each of the receivers for each remaining transmitter;
    processing the detected signals from each line to enhance specular seismic events;

processing the detected signals from each line to enhance non-specular seismic events; and at least one of storing and displaying the specular and non-specular events to enable identification of shallow geohazards.

2. The method of claim 1 wherein the processing to enhance non-specular events includes using stacking RMS velocities or prestack depth migration interval velocities determined during the processing to enhance specular events.

3. The method of claim 2 wherein the processing to enhance non-specular events includes beamforming and beam steering a response of the transmitters and receivers using the stacking RMS velocities or prestack depth migration interval velocities.

4. The method of claim 2 wherein the processing to enhance non-specular events includes beamforming and beam steering a response of the transmitters and receivers.

5. The method of claim 1 wherein the processing to enhance non-specular events includes attenuating non-horizontal specular events by redatuming data traces to cause the non-horizontal specular events to become horizontal, velocity filtering the redatumed data traces and restoring the filtered redatumed traces to an original datum.

6. The method of claim 1 further comprising velocity filtering the recorded signals to attenuate infrastructure noise.

* * * * *